July 9, 1968  G. BIXLER ETAL  3,391,505
INSULATED PANEL

Filed Feb. 16, 1965  2 Sheets-Sheet 2

INVENTORS
GEORGE BIXLER
EUGENE V. HANNIE
BY
Oldham & Oldham
ATTYS.

3,391,505
INSULATED PANEL
George Bixler, Kidron, and Eugene V. Hannie, Orrville, Ohio, assignors to Kidron Body Company, Kidron, Ohio, a corporation of Ohio
Filed Feb. 16, 1965, Ser. No. 433,017
5 Claims. (Cl. 52—268)

ABSTRACT OF THE DISCLOSURE

The present invention relates to a truck body that is comprised of a plurality of preformed panels, all of which panels are of laminated and insulated construction and are assembled with marginal portions of one panel being adjacent panels to define a truck body, a plurality of angles are provided, one leg of each angle being attached to one of the panels at an edge margin wall thereof and the other leg of each angle being attached to an adjacent panel at an edge margin wall thereof, and means to secure the angles to the panels to form the truck body.

---

The present invention relates to truck bodies, and especially to a novel and improved insulated panel truck body that is particularly adapted to be made from a plurality of preformed panels that can be shipped in knocked-down or disassembled condition and be readily assembled by a purchaser of the units to build a truck body therefrom.

Heretofore there have been many different types of insulated truck bodies built, and most of these bodies are built by a truck body manufacturer and are completely assembled by them. Also, the manufacture may attach them to a truck frame. Because these truck bodies are difficult and expensive to ship or for other reasons, it is frequently objectionable to have the truck bodies assembled by the company that makes the truck body components, or to have such company attach the body to a frame.

In various types or trucks, it is important that the contents of the truck body be refrigerated and thus various types of insulated truck bodies have been built in the past. It always is a problem to form these truck bodies in such a manner that an effective insulated unit is provided. In general, this type of a truck body is relatively expensive to build and even then the truck bodies may not provide effective insulation action.

The general object of the present invention is to provide a new and improved type of an insulated truck body that is characterized by being built up from a plurality of insulated panels of generally similar construction and wherein an effective barrier is provided by the panels for transmittal of heat from the outer to the inner surface of the truck body.

Another object of the invention is to provide a plurality of preformed panels that can be shipped in disassembled form but be conveniently and readily assembled by the purchaser of the panels at the ultimate point of use.

A further object of the invention is to provide a novel and improved insulated panel for use in forming truck bodies and wherein novel and improved but sturdy angle members are provided for attaching a plurality of panels together to form a truck body therefrom, the angles being formed from an insulating material, such as molded resin and Fiberglas.

A further object of the invention is to provide a special type of an interlocked engagement between a truck panel and a molded resin-Fiberglas angle attached to a marginal portion of the panel for secure but insulating engagement with a pair of associated panels to affix them together and facilitate the formation of a truck body therefrom.

Another object of the invention is to provide improved means for forming truck bodies of an insulated or refrigerated type from such construction that an attractive, but sturdy unit is provided.

The foregoing and other objects and advantages of the invention will be made more apparent as the specification proceeds.

Attention now is particularly directed to the accompanying drawings wherein.

When referring to corresponding members shown in the drawings and referred to in the specification, corresponding numerals are used to facilitate comparison therebetween.

Figure 1:
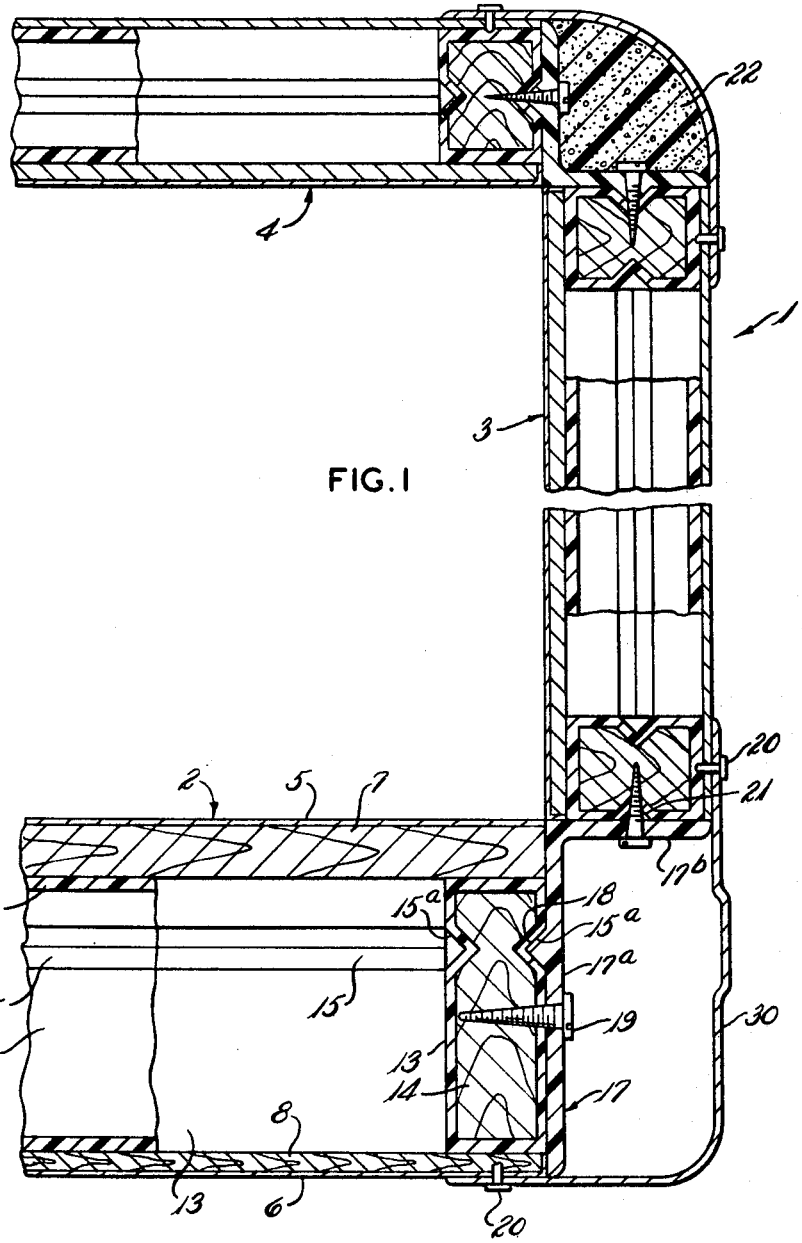
FIG. 1 is a fragmentary vertical section through a plurality of insulated panels of the invention attached together for forming a section or portion of a truck body therefrom, and with portions of the section being broken away to show the members and elements of the panel in elevation.

Attention particularly is directed to the details of the structure shown in the drawings, and a fragmentary portion of a truck body 1 is shown. This portion of the truck body illustrated in the drawings is representative of any suitable size or type of an insulated, or refrigerated truck body that is to be provided by the invention. The truck body is shown as made from a plurality of panels, and usually the truck body is made from preformed panels that are of a laminated and insulated construction and are adapted for convenient assembly by the person constructing the truck body at the point of use, or adjacent such location. Thus, FIG. 1 of the drawings shows a bottom panel 2, an end panel 3, and a top panel 4. Naturally, to complete this truck body 1, another end panel is required that would be of a construction similar to the end panel 3 and a pair of side panels are also required and these would be of constructions comparable to that shown for the end panel 3 or of either of the other panels shown, as desired.

A suitable construction for the bottom panel 2 would comprise an inner plate 5 made from a suitable material, such as aluminum or stainless steel or other materials, and an outer plate or sheet 6 made from a suitable material such as metal, plastic, or resin-Fiberglas layers, etc. Both of these plates or sheets 5 and 6 are usually relatively thin, and preferably each of the plates has a suitable reenforcing member associated therewith on its inner surface. Thus, a relatively thick layer of reenforcing material 7, such as plywood, is shown on the inner surface of the inner plate 5, while a thinner reenforcing sheet 8, usually likewise made of plywood, is usually associated with the inner surface of the outer metal plate 6.

The main body of the bottom panel 2 preferably comprises a preformed relatively solid or firm layer of a plastic foam, which layer or block of foam is indicated by the numeral 9, and such block of foam can be made from any desired material, such as foamed, rigid, polyurethane. To reenforce the foam block 9 and to add further insulating characteristics thereto, usually the foam block 9 is provided with a layer of Fiberglas-resin 10 that is formed as a unit therewith and extends completely therearound. Such layer 10 can be formed, for example, by saturating a Fiberglas-fabric with a liquid resin, such as a polyester, and then wrapping the Fiberglas layer around the foam block 9 and enclosing the resultant member into a suitable mold whereby the Fiberglas-resin layer 10 can be subjected to suitable heat, pressures, and curing conditions so that a relatively rigid, strong structure is provided in which the foam block 9 is enclosed. The Fiberglas reenforcing comprises glass fibers which may be woven into a fabric. Normally the unit formed from the foam block 9 and layer 10 is so sized as to extend between the adjacent surfaces of the reenforcing sheets 7 and 8, but with the foam block unit being shorter both in width and in length than adjacent portions of the bottom panel 2 for reasons to be described hereinafter in more detail.

Figure 2:
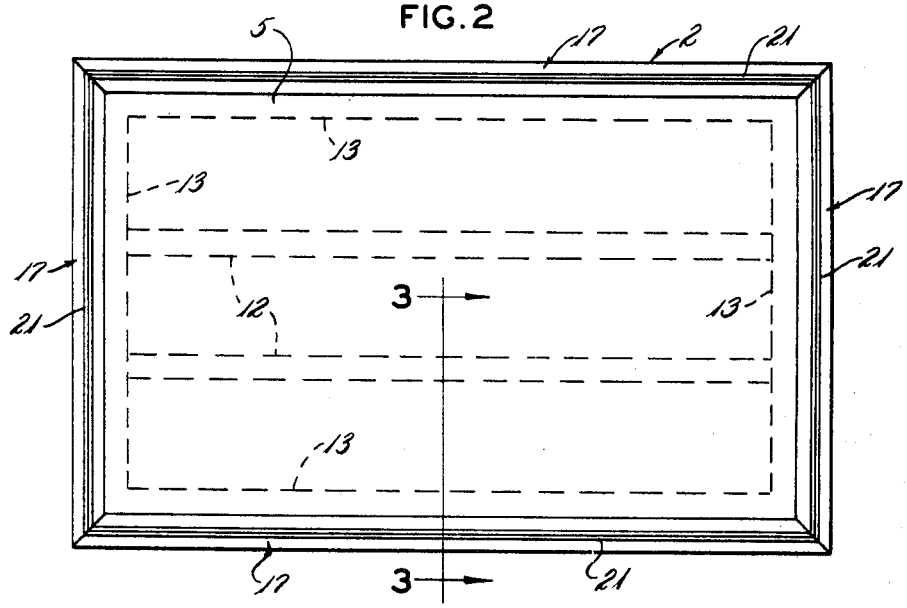
FIG. 2 is an elevation of one of the insulated truck panels of the invention.
Figure 3:
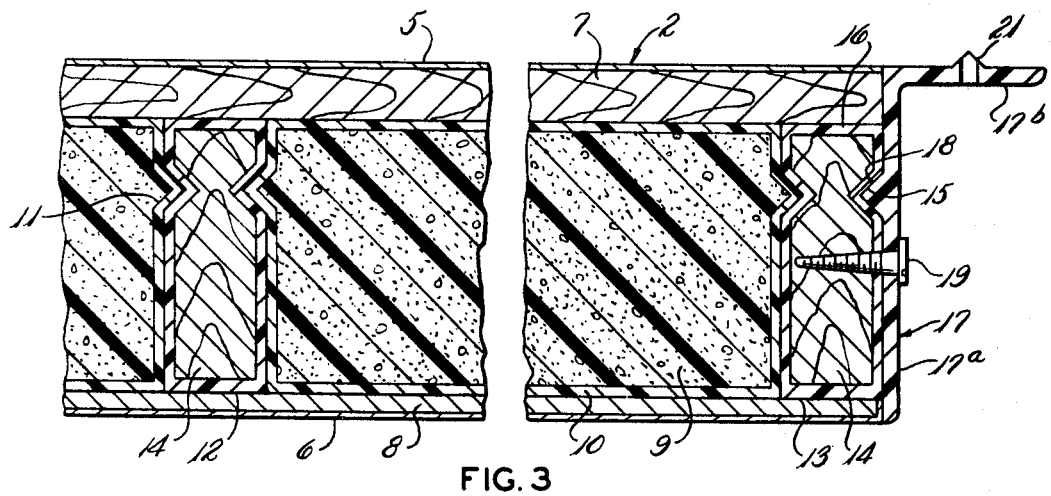
FIG. 3 is an enlarged fragmentary section taken on line 3—3 of FIG. 2.

Yet another feature of the unit formed from the foam block 9 and the layer 10 is that longitudinally extending ribs 11 are formed in the layer 10 on all exposed margins thereof when the resin layer is subjected to heat and pressure to be set in final shape or contour. These ribs 11 usually are of substantially solid V-shape in section and protrude from the layer 10 for mating action with adjacent portions in the bottom panel. Suitable additional reenforcing members, or securing strips, are associated with the bottom panel 2 and specifically are located in the unit formed from the foam block 9 and resin layer 10, and/or at the margins thereof. Typical longitudinally extending reenforcing members 12 are indicated in FIG. 2. FIG. 1 of the drawings best shows an edge reenforce unit or means 13 and preferably a plurality of these edge reenforce means or members 13 are provided to extend completely around the margins of the bottom panel 2 intermediate the inner and outer reenforcing sheets 7 and 8 to form the complete unit of the invention as ready for assembly into a truck. It should be noted that the reenforcing members or means 12 and 13 each preferably comprise a core 14 that is suitably grooved at 15 in its outer surface so that a layer 16, usually formed of the same Fiberglas-resin material as the layer 10, is suitably molded around and bonded to the core 14. The core 14 usually has a wood member therein of any desired size and it can be reenforced with metal, firm plastic foam, or other suitable materials. Usually the layer 16 is of uniform thickness at all portions thereof and it follows the contour of the groove 15 to provide a groove 15a in the surface of the edge reenforce means 13 which groove is formed complementary to the rib 11 provided on the foam block and resin layer unit to engage therewith and aid in retaining the edge reenforce means 13 in position.

It will be noted that one of the grooves 15a is provided in each of two opposed marginal walls of the edge reenforcing member 13.

In order to form the truck body 1 from a plurality of the preformed panels, it is an important feature of the invention that a special member which has a low rate of heat conductivity is provided for securing these panels together with just the inner plates 5, for example, of the various panels being in contact with, or being immediately adjacent each other. It will be realized that all of the panels referred to are of a construction similar to that of the bottom panel 2 which has been described in detail. The layers of the panel can be secured together by cements, resin, nails, or other means as desired. Thus, the foam block 9 and layer 10 can be preformed and have suitable preformed reenforcing members 12 and 13 associated therewith for bonding together in any desired manner. Or, the panel 2 can be built up on the sheet 6 with all of the components just placed together in suitable relation, the resin or plastic being liquid. Thereafter pressure is applied to the laminated panel and it is usually heated to set the resin to provide a unitary panel. Suitable coatings of liquid resin may also be placed on the inner surfaces of the sheets 5 and 7, for example, prior to their assembly to bond them in position in the laminate. The member provided for securing these panels together, and specifically the bottom panel 2 to the end panel 3, is illustrated as comprising a reenforcing angle 17. This reenforcing angle 17 is made from a suitable insulating substance that has high strength, and particularly the invention contemplates using an angle 17 that preferably is made from a molded unit formed from a resin-Fiberglas mixture, or an extruded vinyl resin, or other plastics. Here again, fibers of Fiberglas, or a Fiberglas sheet are impregnated or wetted with a liquid resin, such as a polyester, and then the unit is placed into a mold and cured under heat and pressure to provide a rigid insulating type of composition for the angle 17. As the angle 17 has minimum heat transfer engagement with the panel 2, it also may be made from aluminum or other metals, if desired. It will be seen that one leg 17a of this angle 17 is of substantially, if not exactly, the same length as the height or depth of the bottom panel 2 and is abutted against an end marginal portion, or wall thereof. The leg 17a is provided with a rib 18 thereon that is positioned complementary to one of the grooves 15 in the edge reenforcing member 13 and engages therewith to aid in securing the angle in an interlocked fixed position with relation to the bottom panel 2. Final attachment of the angle 17 to the bottom panel 2 is provided by suitable members, such as lag screws or bolts 19 that extend through the leg 17a and are attached to the edge reenforcing member 13 by engaging the wooden core 14 thereof.

From the accompanying drawing, it will be seen that the adjacent leg 17b of the angle 17 is of the same effective length as the marginal end wall or portion of the end panel 2 and that such leg 17b has a rib 21 in interlocked engagement with a groove provided on an edge reenforcing member in this associated panel. Similar screws or bolt means can be used for affixing the end panel 3 to the leg 17b of this reenforcing and attaching angle 17.

It will be realized that a plurality of panels, like the bottom panels 2, can be made to preform sizes and thicknesses as required for any particular desired truck body 1. These panel units then can be shipped in a disassembled, compact form to a purchaser who then will be able to assemble a plurality of the panels readily and form the desired truck body. It will be realized that if a pair of opposed panels in a truck body are each provided with one of the reenforcing angles 17 along each margin thereof, then none of the other panels in the truck body need have reenforcing angles initially secured thereto. In assembly of a plurality of these panels, the assembler will then only have to attach members, such as the screws or bolts 19, to the exposed legs of the angles 17 and effect the final engagement of the panels for truck body assembly.

The invention further contemplates that end caps or covers 30, usually formed from metal, or a siutable plastic, are attached to the outer plates 6 of the adjacent bottom and end panels 3, for example, and bridge over the reenforcing angle 17. Any suitable means, such as rivets 20, can be used for securing the end caps or covers 30 in position. While the end caps 30 will provide dead air spaces in association with the reenforcing angle 17, molded blocks 22 of a foamed resinous material, such as polyurethane, can be contoured to be positioned between the end caps 30 and the associated reenforcing angle 17. It will be realized that the end caps or covers 30 usually extend just the length of the panels with which they are associated, so that any other suitable corner caps or covers (not shown), similar to the end caps 30, would be provided at the corners of the truck body 1 to bridge over and connect between adjacent ends of the end caps 30 and again a foam insulating block can be positioned under such end or corner caps or the like.

Any suitable doors can be built into any of the panels.

Phenolics and epoxys are other typical resins that may be used in practice of the invention.

From the foregoing, it will be seen that a novel and improved truck body has been provided and this truck body is one that can be built up readily from a plurality of the preformed truck panels. An effective, insulated, sturdy truck body can be obtained, which body can be assembled either at the point of manufacture of the truck panels, or the panels can be assembled after having been shipped to a remote point in knocked down, compact position. The laminated panels are sturdy and well insulated and there is no member that is a good heat conductor that extends between the inner and outer surface of the formed truck body whereby an effectively insulated unit is produced. Thus, it is believed that the objects of the invention have been realized.

While one complete embodiment of the invention has been disclosed herein, it will be appreciated that modification of this particular embodiment of the invention may be resorted to without departing from the scope of the invention as defined in the appended claims.

What is claimed is:

1. A panel for use in making an insulated refrigerator truck body from a plurality of preformed panels, said panel comprising outer metallic sheets, a plywood reenforcing sheet for each of said metallic sheets, a solid foam body positioned intermediate said plywood reenforcing sheets and being smaller than such sheets in both length and width, reenforcing means abutted against said foam body at the edges thereof and extending between said reenforcing sheets and terminating flush with the margins thereof, said reenforcing means including a wood center having a longitudinally extending groove in at least the outer wall thereof, and a molded resin glass fiber cover layer completely uniformly enclosing said wood center and having a longitudinally extending groove on the outer wall thereof, a plurality of molded resin glass fiber angles each having one leg thereof abutted against one margin of said panel and the other leg extending from one margin of said panel for attachement to an adjacent panel, said angles each having a rib on each leg thereof for interlocking with a grove in an adjacent reenforcing means, and means securing said angles to said panel whereby a plurality of such panels can be preformed with angles attached to only two panels to be opposed to each other in a truck body and all adjacent panels can be readily secured together to form a truck body.

2. A panel for use in making an insulated refrigerator truck body from a plurality of preformed panels, said panel comprising outer metallic sheets, a reenforcing sheet for each of said metallic sheets, a solid foam body positioned intermediate said plywood reenforcing sheets and being smaller than such sheets in both length and width, reenforcing means abutted against said foam body at the edges thereof and extending between said reenforcing sheets and terminating flush with the margins thereof, said reenforcing means including a wood center and a molded resin glass fiber cover layer completely uniformly enclosing said wood center and having a longitudinally extending groove on the outer wall thereof, a plurality of molded resin glass fiber angles each having one leg thereof abutted against one margin of said panel and the other leg extending from one margin of said panel attachment to an adjacent panel, and means securing said angles to said panel whereby a plurality of such panels can be preformed with angles attached to only two panels to be opposed to each other in a truck body and all adjacent panels can be readily secured together to form a truck body.

3. A panel for use in making an insulated refrigerator truck body from a plurality of preformed similar panels, said panel comprising outer sheets, a surface reenforced solid foam body positioned intermediate said sheets and being smaller than such sheets in both length and width, reenforcing means including wood blocks abutted against said foam body at the edges thereof and extending between said reenforcing sheets and terminating flush with the margins thereof, said wood block reenforcing means having a longitudinally extending groove in at least the outer wall thereof, a plurality of molded resin glass fiber angles each having one leg thereof abutted against one margin of said panel and the other leg extending from one margin of said panel for attachment to an adjacent panel, said angles each having a ribbon each leg thereof for removably interlocking with the groove in an adjacent reenforcing means, and means securing said angles to said panel at an edge wall thereof by engaging said wood blocks for attachment to an adjacent panel.

4. A panel for use in making an insulated refrigerator truck body from a plurality of preformed similar panels, said panel comprising outer sheets, a surface reenforced solid foam body positioned intermediate said sheets and being smaller than such sheets in both length and width, wood reenforcing means abutted against said foam body at the edges thereof and extending between said reenforcing sheets and terminating flush with the margins thereof, said wood reenforcing means being enclosed by a cover means, a plurality of molded insulative angles each having one leg thereof abutted against one margin of said panel and the other leg extending from one margin of said panel for attachment to an adjacent panel, and means securing said angles to said panel at an edge wall thereof for attachment to an adjacent panel by engagement with the wood reenforcing means provided therein.

5. A panel for use in making an insulated refrigerator truck body from a plurality of preformed panels, said panel comprising outer metallic sheets, a reenforcing sheet for each of said metallic sheets, a solid plastic foam body positioned intermediate said reenforcing sheets and being smaller than such sheets in both length and width, and reenforcing means abutted against said foam body at the edges thereof and extending between said reenforcing sheets and terminating flush with the margins thereof, said reenforcing means including a wood member and a molded resin cover layer completely enclosing said wood member whereby said wood members are available at the margins of the panel for the purpose of receiving and engaging means used to attach an adjacent panel means thereto.

References Cited

UNITED STATES PATENTS

| 2,585,976 | 2/1952 | Teeter | 296—28 |
|---|---|---|---|
| 2,600,140 | 6/1952 | Torseth | 296—28 |
| 2,877,508 | 3/1959 | Ewart | 296—28 |
| 3,003,810 | 10/1961 | Kloote | 296—28 X |
| 3,034,824 | 5/1962 | Schubach | 296—28 |
| 3,149,877 | 9/1964 | Hottenroth | 296—28 |
| 3,157,446 | 11/1964 | Stark | 52—282 X |
| 3,181,659 | 5/1965 | Kohl | 52—615 |
| 3,254,592 | 6/1966 | Chase | 52—615 X |
| 3,258,892 | 7/1966 | Rushton | 52—615 |
| 3,310,917 | 3/1967 | Simon | 52—281 X |
| 3,163,434 | 12/1964 | Krueger. | |

BENJAMIN HERSH, *Primary Examiner.*

J. A. PEKAR, *Assistant Examiner.*